United States Patent
Sekine et al.

(10) Patent No.: US 7,225,328 B2
(45) Date of Patent: May 29, 2007

(54) MAINTENANCE TERMINAL OF DISK ARRAY DEVICE

(75) Inventors: Kenji Sekine, Odawara (JP); Masanobu Yamamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 10/849,120

(22) Filed: May 20, 2004

(65) Prior Publication Data

US 2005/0210207 A1    Sep. 22, 2005

(30) Foreign Application Priority Data

Mar. 11, 2004    (JP) .............. 2004-069305

(51) Int. Cl.
G06F 15/177    (2006.01)
G06F 9/44      (2006.01)
G06F 9/22      (2006.01)
G06F 12/06     (2006.01)
G06F 12/08     (2006.01)

(52) U.S. Cl. .............. 713/100; 713/1; 713/2; 711/111; 711/112; 711/114

(58) Field of Classification Search ............ None
See application file for complete search history.

(56) References Cited

U.S. PATENT DOCUMENTS

| | | | |
|---|---|---|---|
| 4,817,035 A | 3/1989 | Timsit | |
| 5,148,432 A | 9/1992 | Gordon et al. | |
| 5,717,570 A * | 2/1998 | Kikinis | 361/685 |
| 5,835,703 A | 11/1998 | Konno | |
| 5,880,955 A | 3/1999 | Matoba et al. | |
| 6,076,142 A * | 6/2000 | Corrington et al. | 711/114 |
| 6,240,058 B1 * | 5/2001 | Pitz et al. | 369/30.39 |
| 6,654,382 B1 | 11/2003 | Bare et al. | |
| 6,809,505 B2 * | 10/2004 | Peeke et al. | 324/66 |
| 2002/0101711 A1 | 8/2002 | Gold | |
| 2002/0142765 A1 | 10/2002 | Rhoads | |
| 2003/0018756 A1 * | 1/2003 | Nguyen et al. | 709/220 |

(Continued)

FOREIGN PATENT DOCUMENTS

JP    10-187358    12/1996

(Continued)

OTHER PUBLICATIONS

"Storage Works Solutions, 24 SBB, DSSI RAID Subsystem, Deskside Expansion Unit (SW301), User's Guide", Digital Equipment Corporation, Apr. 1996, pp. i-v, 1-38, Glossary-1, and Index 1-2.

*Primary Examiner*—James K. Trujillo
(74) *Attorney, Agent, or Firm*—Reed Smith LLP; Stanley P. Fisher, Esq.; Juan Carlos A. Marquez, Esq.

(57) ABSTRACT

A maintenance terminal for a disk array device is provided which can make setting of the disk array device and can easily confirm the setting contents. The maintenance terminal for the disk array device has three jumper connectors as setting terminals into which a conduction pin is inserted. The maintenance terminal also has eight light emitting diodes disposed in two rows and being capable of turning on and off in correspondence with a setting state of the disk array device in a network selectively changed through insertion of the conduction pin into the setting terminals.

15 Claims, 9 Drawing Sheets

U.S. PATENT DOCUMENTS

| | | |
|---|---|---|
| 2004/0049633 A1 | 3/2004 | Suzuki et al. |
| 2005/0015647 A1 | 1/2005 | Okada et al. |
| 2005/0044230 A1* | 2/2005 | Venugopal et al. ......... 709/227 |
| 2006/0095667 A1* | 5/2006 | Suzuki et al. ............... 711/114 |

FOREIGN PATENT DOCUMENTS

| | | |
|---|---|---|
| JP | 2002-157211 | 11/2000 |
| WO | WO 03/029985 A1 | 4/2003 |

* cited by examiner

MAINTENANCE TERMINAL OF DISK ARRAY DEVICE

CROSS-REFERENCE TO RELATED APPLICATION

The present application claims priority from Japanese application JP2004-069305 filed on Mar. 11, 2004, the content of which is hereby incorporated by reference into this application.

BACKGROUND OF THE INVENTION

A) Field of the Invention

The present invention relates to a disk array device used as a maintenance terminal.

B) Description of the Related Art

In a disk array device, a maintenance terminal attached thereto, such as a service processor (SVP), has been used conventionally. In addition to the maintenance terminal, a remote console (RMC) is provided which is installed at a remote site and connected to a plurality of disk array devices via a network. This remote terminal controls the operation and maintenance of a plurality of devices. Refer to Japanese Patent Laid-open Publication No. 2002-157211.

Since the operation and maintenance of the device can be controlled by using a display and a keyboard at the remote terminal, the maintenance terminal attached to a disk array device is not provided with a display and a keyboard from the viewpoint of cost reduction.

However, when a connection failure occurs at such a disk array device, particularly when a connection failure from the remote terminal occurs, the remote terminal cannot check the setting contents of the disk array device because there is no display screen.

In such a case, a personal computer (PC) is connected to the network to which the disk array device is connected. After the personal computer (PC) accesses the disk array device via the network, the setting contents of the disk array device can be referred to. In this manner, it is not easy to refer to the setting contents.

SUMMARY OF THE INVENTION

It is therefore an object of the present invention to provide a maintenance terminal for a disk array device capable of performing setting of the disk array device and easily confirming the setting contents of the disk array device.

In order to solve the above-described problem and achieve the object of the invention, the maintenance terminal for a disk array of this invention is provided with a plurality of setting terminals into which a conduction pin is selectively inserted, to selectively change the setting of the disk array in a network. Since the conduction pin can be selectively inserted into or removed from a plurality of setting terminals, a simple insertion and removal operation can make setting of the disk array device in the network.

The maintenance terminal for a disk array of this invention is also provided with a plurality of light emitting elements capable of displaying the setting state by turning on and off in correspondence with the setting state of the disk array device in a network selectively changed through insertion of the conduction pin into the plurality of setting terminals. The setting state of the disk array device in the network can be visually confirmed from the state displayed by turning on and off the plurality of light emitting elements.

Even if a remote terminal is not connected to the disk array device via the network, since a plurality of light emitting elements and setting terminals are mounted on the maintenance terminal, it is possible to acquire and set information such as the setting state of the disk array device in the network. By selectively inserting the conduction pin into a plurality of setting terminals or by issuing a remote request from the remote terminal, the connection of the disk array device in the network can be confirmed from the state displayed by turning on and off a plurality of light emitting elements.

According to the invention, a maintenance terminal for a disk array device is provided which can make setting of the disk array device and can easily confirm the setting contents of the disk array device. In particular, a plurality of light emitting elements can display a specific pattern representative of the setting state of the disk array device in the network for connection check in a normal state. It is possible to change the illumination pattern by selectively inserting the conduction pin into the plurality of setting terminals or in response to a remote request from an operation terminal or a host.

DESCRIPTION OF THE EMBODIMENTS

Embodiments of the invention will be described with reference to the accompanying drawings.

First, a disk array device will be described to which a maintenance terminal of an embodiment of the invention is applied.

Figure 12:
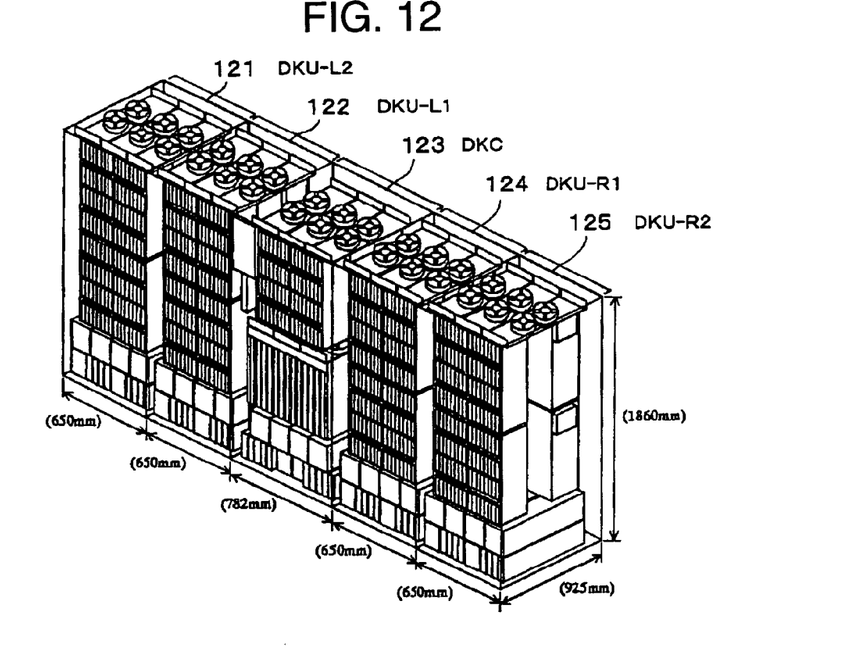
FIG. 12 is a diagram showing a disk array device according to the invention.

FIG. 12 is a diagram showing a disk array device according to an embodiment of the invention. As shown in FIG. 12, a disk array unit (DKU-L2) 121, a disk array unit (DKU-L1) 122, a disk array unit (DKU-R1) 124 and a disk array unit (DKU-R2) 125 respectively for storing data, together with a control unit (DKC) 123 for controlling the units are housed in the same frame.

Figure 13:
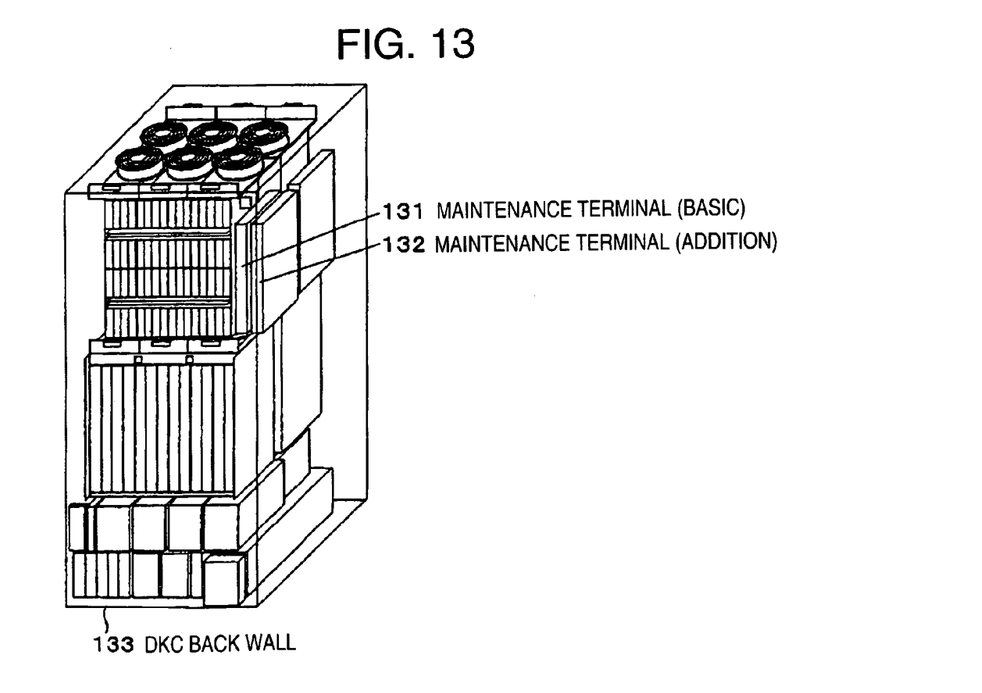
FIG. 13 is a diagram showing the position of a maintenance terminal in the disk array device according to the invention.

FIG. 13 is a diagram showing maintenance terminals of the disk array device according to the invention. Referring to FIG. 13, on the back side 133 of the control unit (DKC) 123 shown in FIG. 12, a service maintenance terminal 131 and a standby maintenance terminal 132 are mounted. The reason why the service maintenance terminal 131 and standby maintenance terminal 132 are prepared is to enable setting of logical storage areas LU1 and LU2 provided for backup of each of the disk array units 121, 122, 124 and 125.

Figure 1:
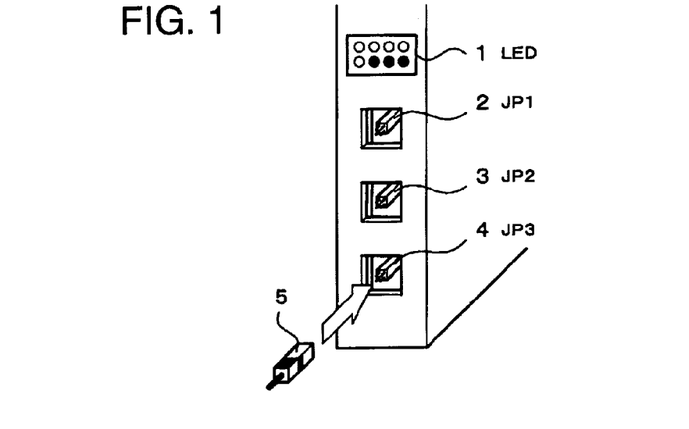
FIG. 1 is a diagram showing light emitting diodes (LED) and jumper connectors (JP) of a maintenance terminal for a disk array device according to the invention.

FIG. 1 is a diagram showing an LED array and jumpers JP mounted on the maintenance terminal for the disk array according to the invention. Referring to FIG. 1, each of the service maintenance terminal 131 and standby maintenance terminal 132 shown in FIG. 13 has a light emitting diode array (LED) 1 having eight light emitting elements disposed in two rows, and three setting terminals: a jumper connector (JP1) 2, a jumper connector (JP2) 3 and a jumper connector (JP3) 4, into which a conduction jumper pin 5 is inserted, respectively mounted on the same wall.

Figure 4:
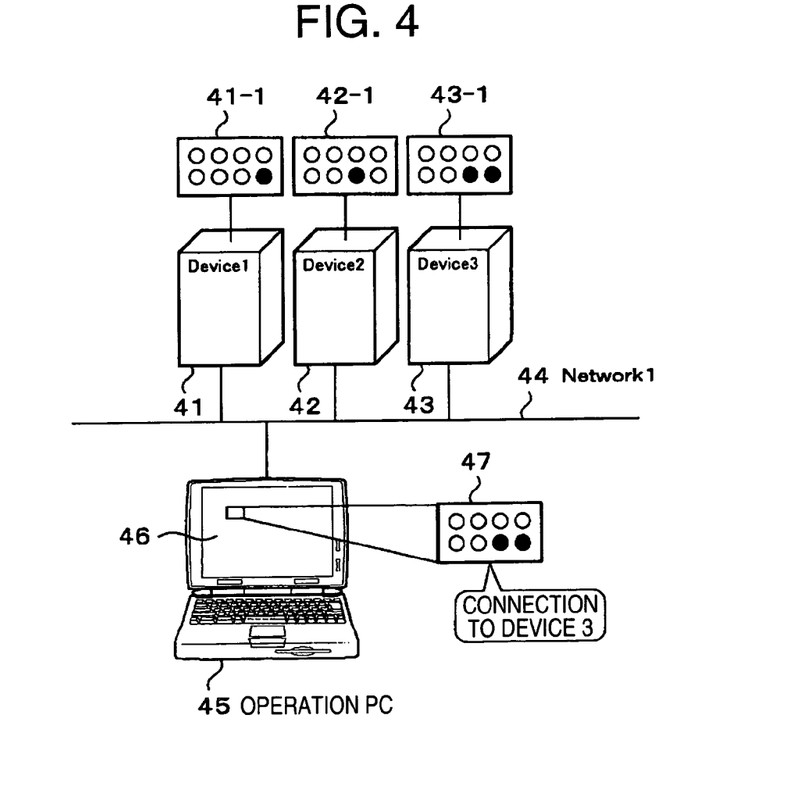
FIG. 4 is a diagram illustrating connection for connection check using LEDs according to the invention.

FIG. 4 is a diagram illustrating connection check using LEDs according to the invention. Referring to FIG. 4, a disk array device 41 mounted with a light emitting diode array (LED) 41-1 for displaying the setting state by the jumper connector (JP1) shown in FIG. 1, a disk array device 42 mounted with a light emitting diode array (LED) 42-1 for displaying the setting state by the jumper connector (JP2) and a disk array device 43 mounted with a light emitting diode array (LED) 43-1 for displaying the setting state by the jumper connector (JP3) are connected to an operation personal computer (PC) 45 via a network 44.

In the interconnection shown in FIG. 4, without mounting a display and a keyboard, it is possible to perform remote connection via the network 44 from the operation personal computer (PC) 45 to each maintenance terminal of the disk array devices 41, 42 and 43 equipped with the light emitting diode arrays (LED) 41-1, 42-1 and 43-1 and jumper connectors (JP1), (JP2) and (JP3).

First, description will be made on initialization setting according to the first embodiment.

In the interconnection shown in FIG. 4, the initialization setting is performed if it is not possible to perform remote connection via the network 44 from the operation personal computer (PC) 45 to each maintenance terminal of the disk array devices 41, 42 and 43. With the initialization setting, a failure can be eliminated.

In order to realize the above-described remote connection, an IP address representative of the network identification number of each maintenance terminal mounted on the disk array devices 41, 42 and 43 is forcibly initialized, and a password for allowing an input operation to each of the disk array devices 41, 42 and 43 is initialized. For this initialization, the conduction jumper pins 5 may be inserted into all the jumper connectors (JP1), (JP2) and (JP3).

Next, description will be made on IP address display and IP address illumination according to the second embodiment of the invention.

In the interconnection shown in FIG. 4, if it is not possible to perform remote connection via the network 44 from the operation personal computer (PC) 45 to each maintenance terminal of the disk array devices 41, 42 and 43, it is necessary to refer to the IP address of each maintenance terminal mounted on the disk array devices 41, 42 and 43. In this case, the conduction jumper pins 5 are inserted into the jumper connectors (JP1), (JP2) and (JP3) of each maintenance terminal mounted on the disk array devices 41, 42 and 43, to display the IP address by the light emitting diode arrays (LED) 41-1, 42-1 and 43-1. In this manner, by displaying the IP address, the reason of inability of the remote connection can be inspected.

First, a first example of displaying an IP address will be described.

Figure 8:
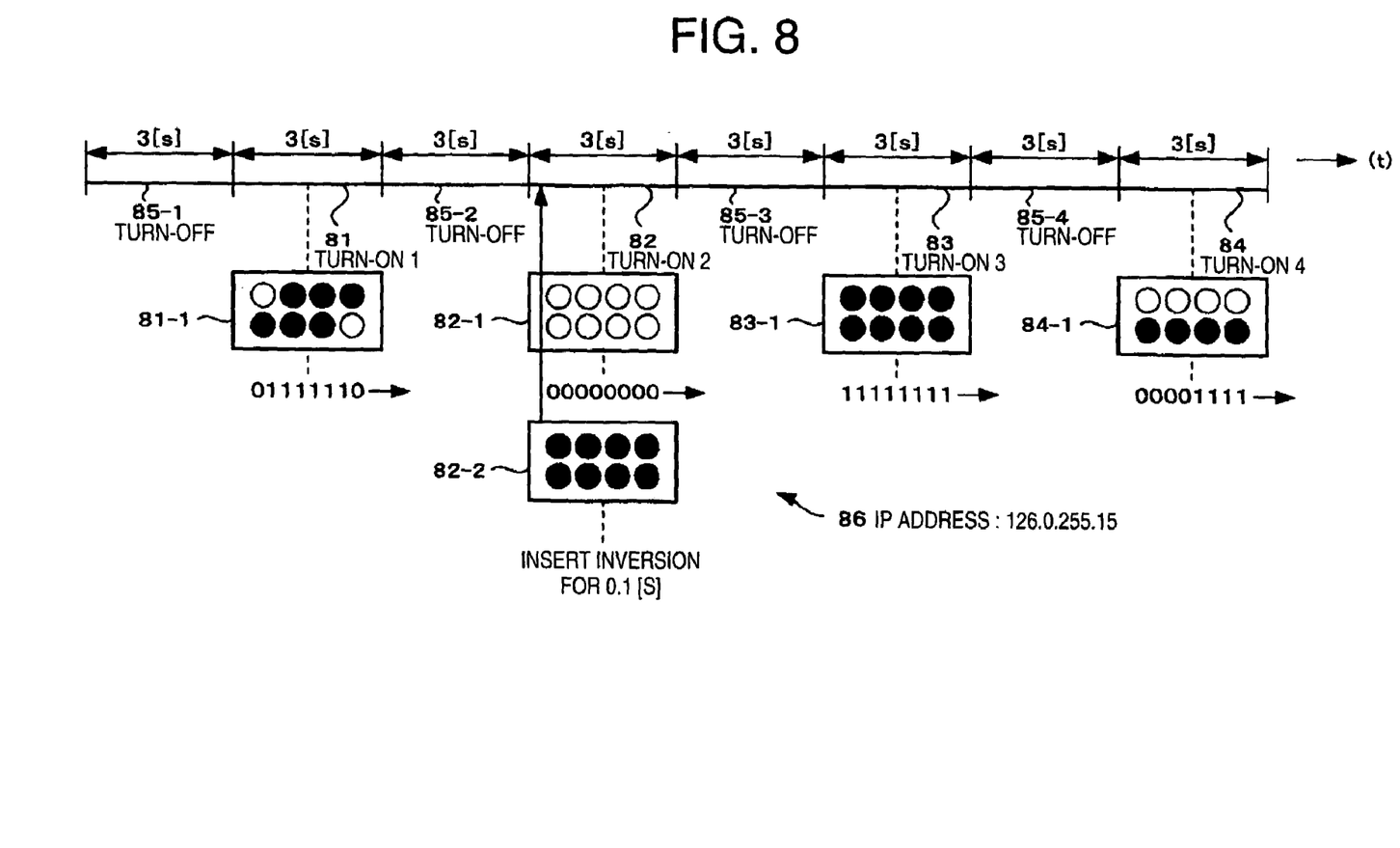
FIG. 8 is a diagram illustrating eight LEDs and an IP address display method according to the invention.

A number represented by one byte of binary numbers is obtained by using the light emitting diode array (LED) having eight light emitting elements. Turn-off the light emitting diode (LED) indicates "0" and turn-on indicates "1". In order to display "0", the inverted state is inserted once for 0.1 second to clarify a delimiter.

A display example is shown in FIG. 8. In FIG. 8, the abscissa represents time (t). At the first illumination indicated at 81, turn-on and turn-off of the light emitting diode array (LED) 81-1 indicate "101111110". Immediately before that at the second illumination indicated at 82, all turn-off state of the light emitting diode array (LED) 82-1 is indicated "00000000", the inverted all turn-on state "11111111" is inserted once for 0.1 second. At the third illumination indicated at 83, all turn-on state of the light emitting diode array (LED) 83-1 indicates "11111111". At the fourth illumination indicated at 84, turn-on and turn-off of the light emitting diode array (LED) 84-1 indicate "00001111". As the binary representations from the first to fourth illumination events are converted into decimal numbers, an IP address 86 is "126, 0, 255, 15".

Turn-off events 85-1, 85-2, 85-3 and 85-4 are inserted immediately before the first to fourth turn-on events.

Next, a second example of displaying an IP address will be described.

Figure 9:
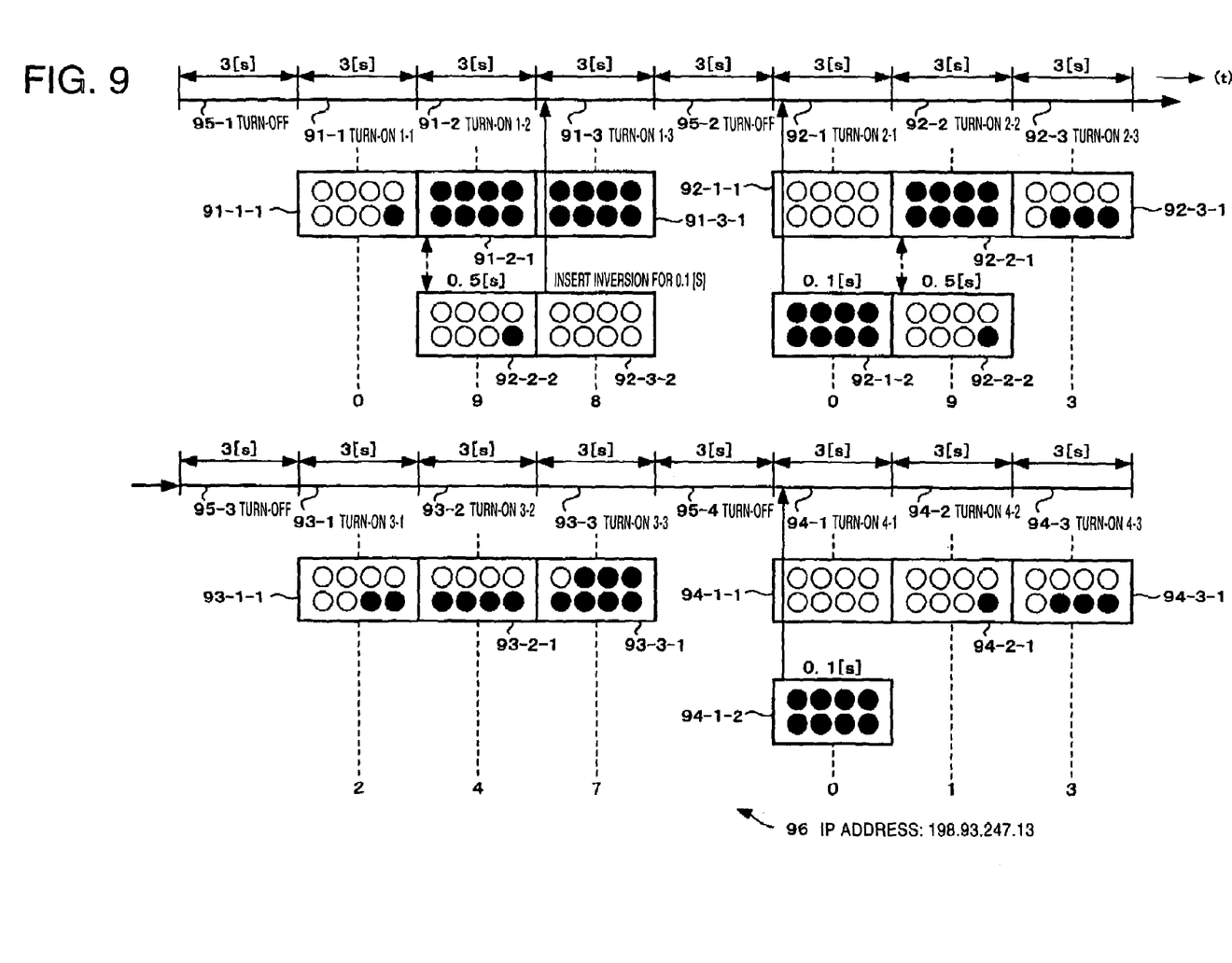
FIG. 9 is a diagram illustrating eight LEDs and another IP address display method according to the invention.

In this example, the number of turned-on light emitting elements of the light emitting diode array (LED) represents a decimal number. "9" is represented by alternately turning on "8" and "1" at an interval of 0.5 second. Immediately before displaying "0" and "8", the inverted state is inserted once for 0.1 second to clarify a delimiter.

A display example is shown in FIG. 9. In FIG. 9, at the (1-1)-th illumination indicated at 91-1, since the number of turned-on light emitting elements of the light emitting diode array (LED) 91-1-1 is "00000001", it indicates "1". At the (1-2)-th illumination indicated at 91-2, since the number of turned-on light emitting elements "11111111" indicated at 91-2-1 and the number of turned-on light emitting elements "00000001" indicated at 91-2-2 are alternately displayed at an interval of 0.5 second, it indicates "9". Immediately before that at the (1-3)-th illumination indicated at 91-3, the number of turned-on light emitting elements "11111111" of the light emitting diode array 91-3-1 is displayed, the inverted state "00000000" indicated at 91-3-2 is once inserted for 0.1 second so that it indicates "8".

Immediately before that at the (2-1)-th illumination indicated at 92-1, the number of turned-on light emitting elements "00000000" of the light emitting diode array (LED) 92-1-1 is displayed, the inverted state "11111111" indicated at 92-1-2 is once inserted for 0.1 second so that it indicates "0". At the (2—2)-th illumination indicated at 92-2, since the number of turned-on light emitting elements "11111111" indicated at 92-2-1 and the number of turned-on light emitting elements "00000001" indicated at 92-2-2 are alternately displayed at an interval of 0.5 second, it indicates "9". At the (2-3)-th illumination indicated at 92-3, since the number of turned-on light emitting elements of the light emitting diode array (LED) 92-3-1 is "00000111", it indicates "3".

At the (3-1)-th illumination indicated at 93-1, since the number of turned-on light emitting elements of the light emitting diode array (LED) 93-1-1 is "00000011", it indicates "2". At the (3-2)-th illumination indicated at 93-2, since the number of turned-on light emitting elements of the light emitting diode array (LED) 93-2-1 is "00001111", it indicates "4". At the (3-3)-th illumination indicated at 93-3, since the number of turned-on light emitting elements of the light emitting diode array (LED) 93-3-1 is "01111111", it indicates "7".

Immediately before that at the (4-1)-th illumination indicated at 94-1, the number of turned-on light emitting elements "00000000" of the light emitting diode array (LED) 94-1-1 is displayed, the inverted state "11111111" indicated at 94-1-2 is once inserted for 0.1 second so that it indicates "0". At the (4-2)-th illumination indicated at 94-2, since the number of turned-on light emitting elements of the light emitting diode array (LED) 94-2-1 is "00000001", it indicates "1". At the (4-3)-th illumination indicated at 94-3, since the number of turned-on light emitting elements of the light emitting diode array (LED) 94-3-1 is "00000111", it indicates "3".

Description will be made on the status display and error code illumination for each status according to the third embodiment of the invention.

Figure 11:
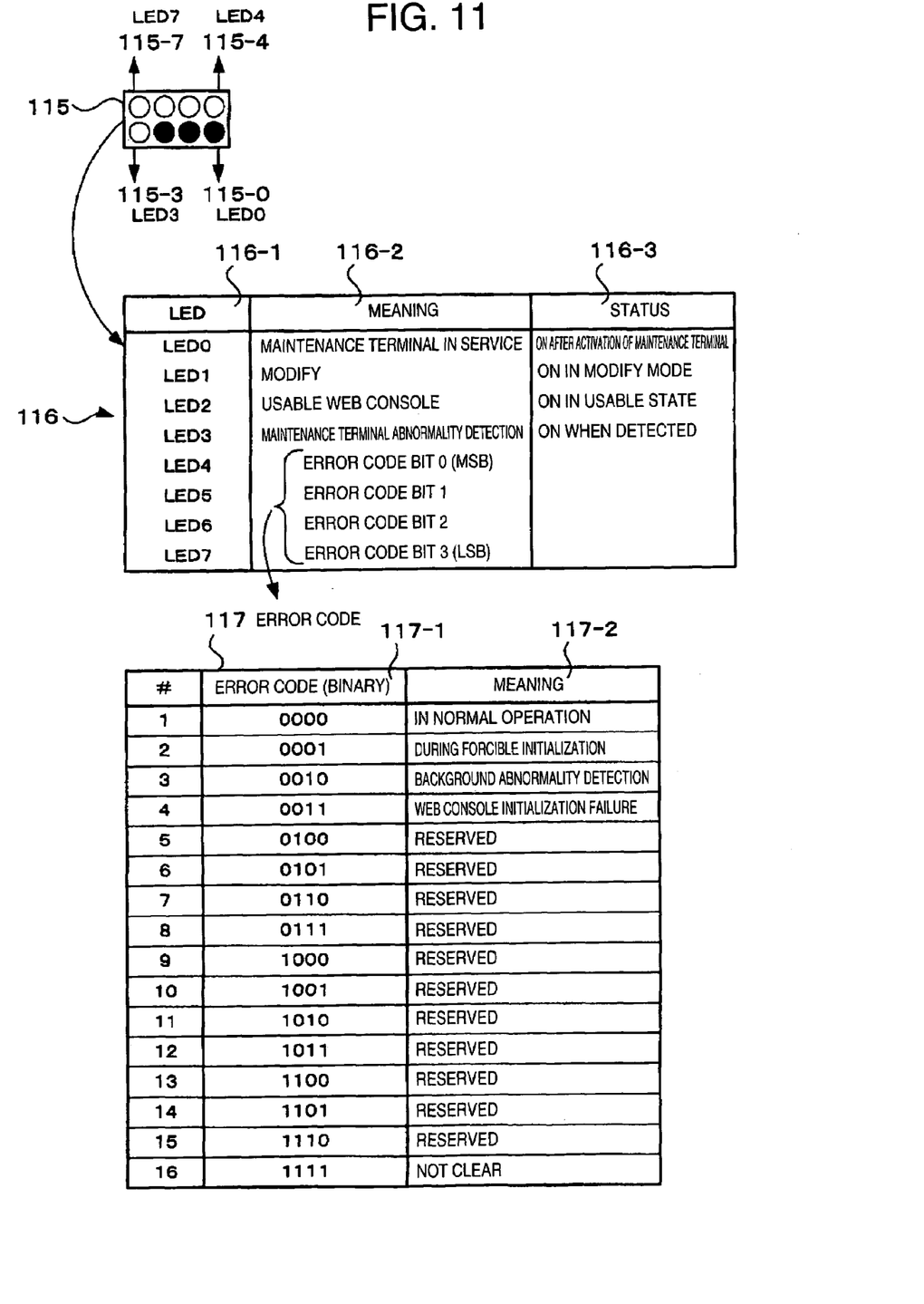
FIG. 11 is a diagram showing the specifications of LED error displays according to the invention.

In this embodiment, the current status and an error code of each maintenance terminal installed in the disk array devices 41, 42 and 43 are displayed. An example of the display method is illustrated in FIG. 11. Referring to FIG. 11, the meanings 116-2 and statuses 116-3 shown in Table 116 are allocated in correspondence with the illumination display events of LED 0 to LED 7: from the LED0 of the light emitting diode array (LED) 115 indicated at 115-0, LED3 indicated at 115-3, LED4 indicated at 115-4, and to LED 7 indicated at 115-7.

In Table 116, turn-on of LED0 means that the maintenance terminal is in service and LED0 is in the on-state when the maintenance terminal is activated. Turn-on of LED1 means a modify mode and LED1 is in the on-state during the modify mode. Turn-on of LED2 means that a Web console can be used and LED2 turns on in a use enabled state. Turn-on of LED3 means a maintenance terminal abnormality detection and LED3 turns on when the abnormality is detected. Turn-on of LED4 means that an error code bit is 0 (MSB). Turn-on of LED5 means that an error code bit is 1. Turn-on of LED6 means that an error code bit is 2. Turn-on of LED7 means that an error code bit is 3 (LSB).

Of error code bits 117, "0000" means that the maintenance terminal is under a normal operation. "0001" means that the maintenance terminal is under forcible initialization. "0010" means a background abnormality detection. "0011" means a Web console initialization failure.

If there are a plurality of error factors, the error codes are continuously displayed at an interval of 1 second. If there is no return message for search broadcast from the operation personal computer (PC) 45 to each disk array device via the network 44, it is possible to confirm that a task at each maintenance terminal is normal.

The control specification of LED will be described.

The disk array device controls LED0 so that LED0 turns on after the activation of the maintenance terminal is completed. After this LED0 turns on, the maintainer can log in and use the maintenance terminal.

The disk array device controls LED1 so that LED1 turns on when the maintenance terminal changes its mode to the modify mode, and turns off when a view mode is resumed.

The disk array device controls LED2 so that LED2 turns on when a Web access preparation process becomes ready. This ready state indicates that the Web console can be logged in. During refresh, LED2 is controlled to be turned off, and turned off when the ready state is resumed.

In the error code display by LED4 to LED7, the disk array device controls LED4 to LED7 so that an application detected an error notifies the error code to an external IO control task. The external IO control task stores the notified error code in the maintenance terminal and displays the error code by using LED4 to LED7. When a plurality of error codes are reported, these error codes are continuously displayed at a constant time interval. Error bits are 4 bits and indicate 0 to 15.

Description will be made on connection check according to the fourth embodiment.

Connection check is performed through remote connection from the operation personal computer (PC) 45 shown in FIG. 4 via the network 44 to each maintenance terminal of the disk array devices 41, 42 and 43. A plurality of disk array devices are interconnected on the network (LAN) 44. It is possible to communicate with only one disk array device during maintenance by disconnecting the connection cable to the network (LAN) 44. However, disconnection of the network (LAN) 44 from some disk array devices during maintenance results in an inability to transmit a failure notice when an error occurs at another disk array device. For the maintenance work of several tens of disk array devices, the work amount and the number of errors can be reduced, when the maintenance is performed by using the operation personal computer (PC) 45 capable of connecting to all disk array devices, more than when the operation terminal is connected to each disk array device one device at a time to change the network (LAN) connection.

Figure 2:
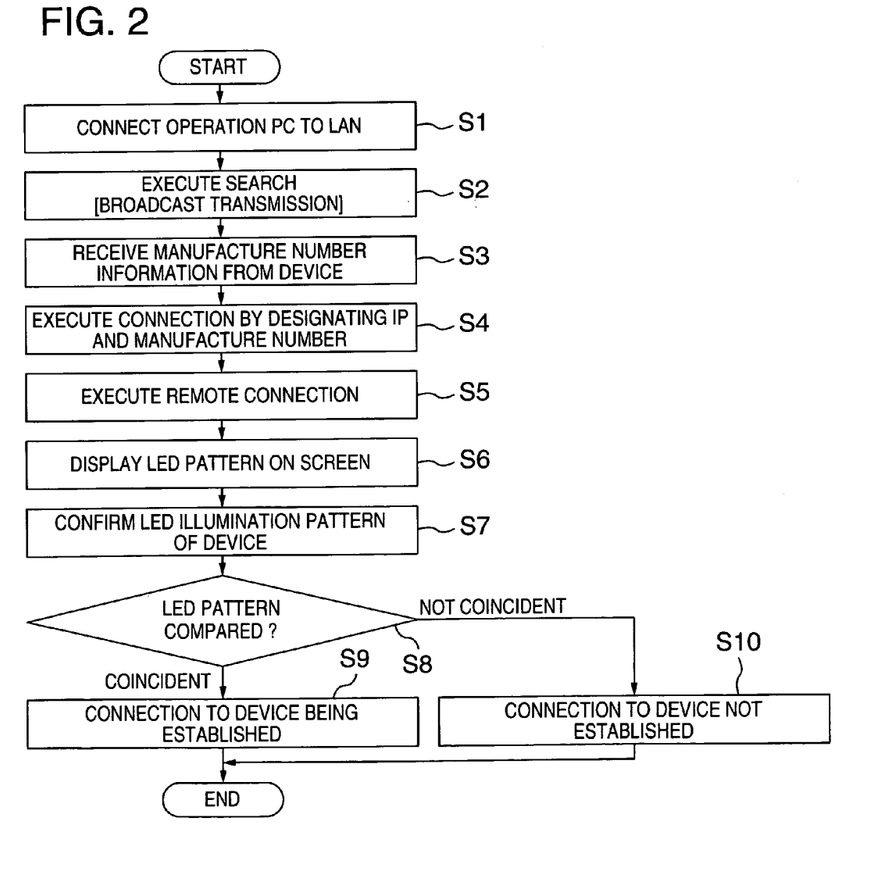
FIG. 2 is a flow chart illustrating connection check using LEDs according to the invention.

FIG. 2 is a flow chart illustrating the procedure of connection check using LEDs according to the invention.

Referring to FIG. 2, first the operation personal-computer (PC) 45 is connected to the network ((LAN) 44 (Step S1), and the personal computer (PC) 45 performs a search for the connection check through broadcast to the network (LAN) 44 (Step S2). Upon reception of manufacture number information from each of the disk array devices 41, 42 and 43 (Step S3), the operation personal computer (PC) 45 executes connection by using the IP address and manufacture number (Step S4).

The operation personal computer (PC) 45 executes remote connection to each of the disk array devices 41, 42 and 43 (Step S5), displays an LED pattern representative of the connection state of each designated one of the disk array devices 41, 42 and 43 on the display screen (Step S6), and confirms the LED illumination pattern representative of the connection state of each of the disk array devices 41, 42 and 43 (Step S7). The actual LED illumination pattern on the maintenance terminal of each of the disk array devices 41, 42 and 43 is compared with the LED illumination pattern on the display screen of the operation personal computer (PC) 45 (Step S8), and if both the patterns are coincide, the connection is being established (Step S9), whereas if not, the connection is not established (Step S10).

Figure 3:
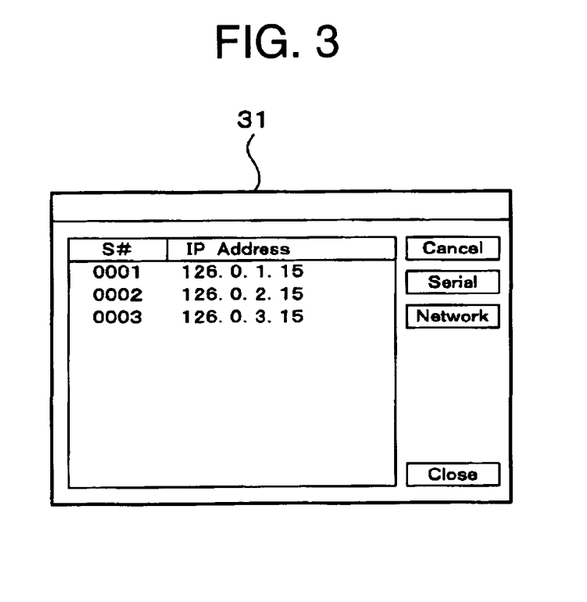
FIG. 3 is a diagram showing a screen of connection from an operation terminal to a maintenance terminal.

In the remote connection by the procedure illustrated in FIG. 2, the list of IP addresses and manufacture numbers are checked on a screen 31 shown in FIG. 3 for connection to each maintenance terminal from the operation personal computer (PC) 45. If the IP address and manufacture number are erroneously recognized, the connection not intended is established. For example, if an incorrect label of the IP address and manufacture number is attached to the disk array device, the connection not intended is established. Connection check through visual confirmation can be made by displaying the specific pattern of LEDs of the maintenance terminal of each disk array device in the network (LAN) 44 and the pattern of the same disk array device on the screen of the operation personal computer (PC) 45.

The connection check state is illustrated in FIG. 4. In the example of FIG. 4, the connection check can be visually made by checking the coincidence between the LED illumination pattern "2" representative of the connection state of the disk array device 43 displayed on the screen of the operation personal computer (PC) 45 and the LED illumination pattern "2" of the maintenance terminal of the disk array device 43. When a component is to be replaced during maintenance setting, replacement setting is performed from a remote site such as a different building, and another maintainer replaces only the component at the real site. In such a case, the disk array device can be selected correctly through the above-described LED pattern check.

Next, description will be made on group ID illumination according to the fifth embodiment. Group classification check is performed when a plurality of disk array devices are classified into several groups, each being subjected to the same setting. If the same setting is made to a plurality of disk array devices at the same time, the setting work can be reduced and a setting error can be reduced more than when the setting is performed separately for each disk array device. However, there is a risk of miss-confirmation of the disk array device if the IP address and manufacture number only are used. In order to avoid this, when the operation personal computer (PC) 45 performs setting of a plurality of disk array devices, the maintenance terminals subjected to settings are requested to turn on a certain LED pattern, whereas the other maintenance terminals are requested to turn off LEDs. In this manner, the disk array devices subjected to setting can be confirmed by only one visual check.

Figure 5:
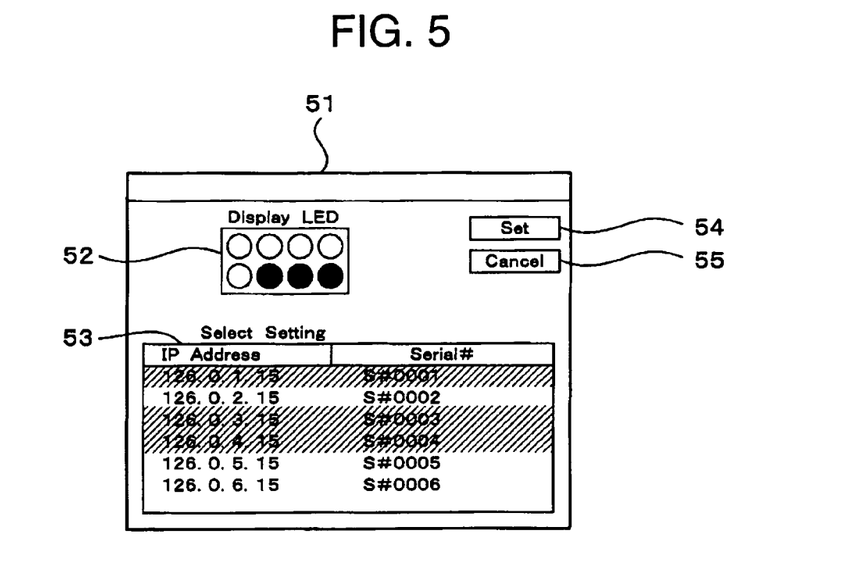
FIG. 5 is a diagram showing a setting execution screen for group setting using LEDs according to the invention.
Figure 6:
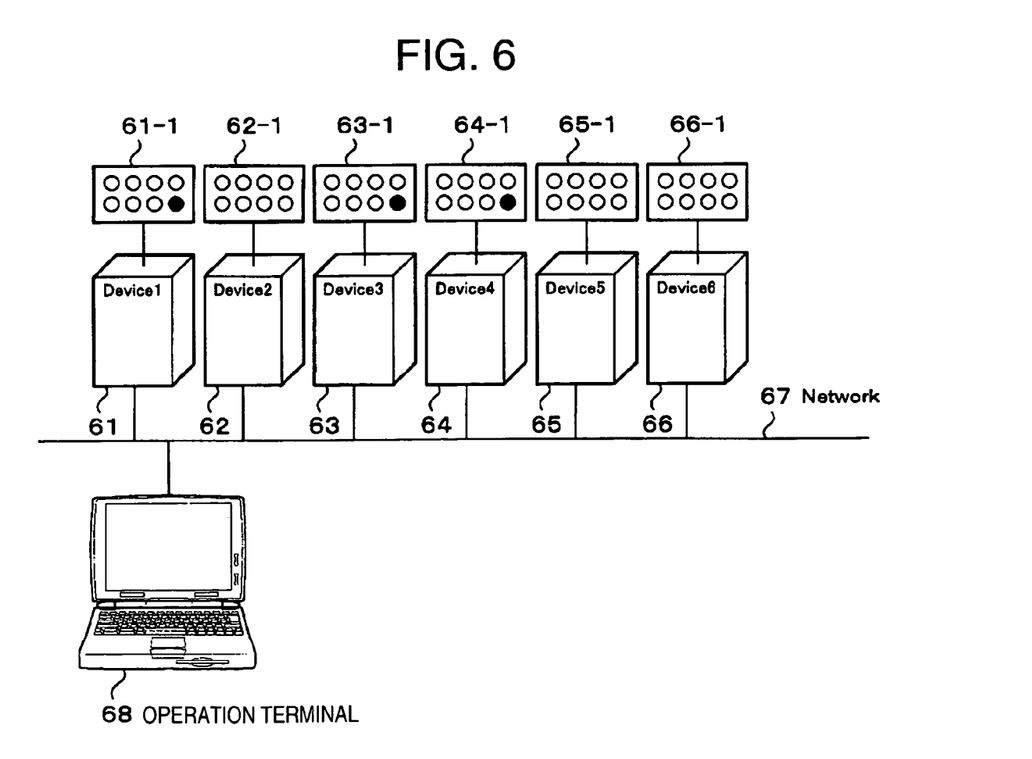
FIG. 6 is a diagram showing interconnection for group setting using LEDs according to the invention.
Figure 7:
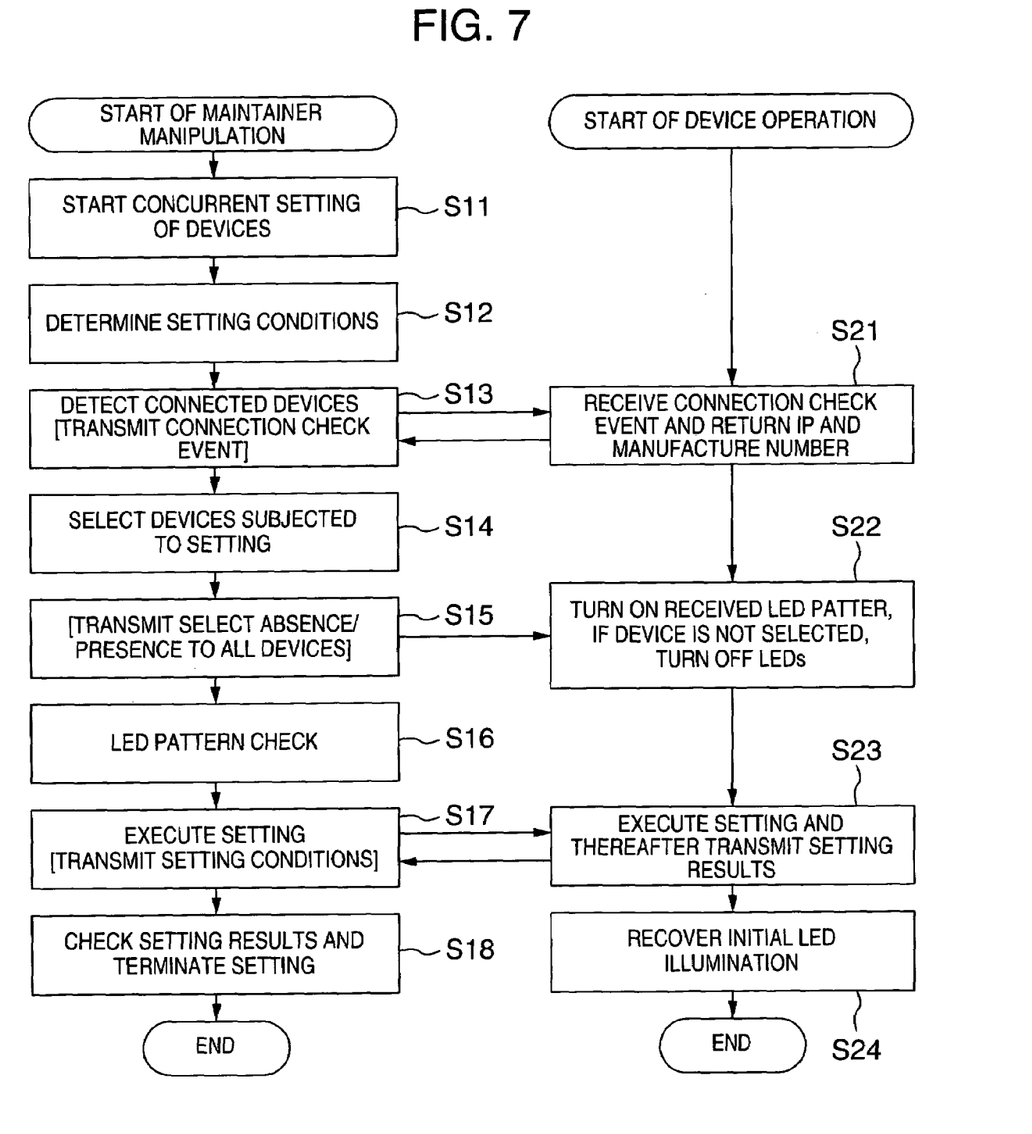
FIG. 7 is a flow chart illustrating maintainer manipulation and device operation respectively for group setting using LEDs according to the invention.

The group setting screen is shown in FIG. 5, interconnection is shown in FIG. 6, and the maintainer manipulation and disk array device operation are illustrated in FIG. 7. Referring to FIG. 5, displayed on a group setting screen 51 are an LED illumination pattern 52 of the maintenance terminal of each of the disk array devices subjected to setting, the IP addresses and manufacture numbers 53 of the disk array devices selected, a setting key 54 and a cancel key 55. In the example shown in FIG. 6, the maintenance terminals of the disk array devices 61, 63 and 64 subjected to setting are requested to display the LED illumination pattern "1" and the maintenance terminals of the other disk array devices 62, 65 and 66 are requested to turn off LEDs.

Referring to FIG. 7, on the side of maintainer manipulation, upon start of concurrent setting of disk array devices (Step S11), the setting conditions are determined (Step S12) and a connection check event is transmitted to detect connected disk array devices (Step S13). On the side of disk array device operation, upon reception of the connection check event, the IP address and manufacture number are returned (Step S21). On the side of maintainer manipulation, the disk array devices to be subjected to setting are selected (Step S14), and a notice of whether the disk array device was selected and an LED pattern are transmitted to all disk array devices (Step S15).

On the side of disk array device operation, the received LED pattern is turned on, and if the disk array device is not selected, the LEDs are turned off (Step S22). On the side of maintainer manipulation, the LED illumination pattern of the disk array device is visually confirmed (Step S16), and setting conditions are transmitted for execution of setting (Step S17). On the side of disk array device operation, setting is executed and thereafter the setting result is transmitted (Step S23). On the side of maintainer manipulation, the setting results are confirmed to thereafter terminate the setting (Step S18). On the side of disk array device operation, the initial LED illumination is recovered (Step S24).

Next, description will be made on discrimination between service and standby terminals.

As described previously, each disk array device has two maintenance terminals, the service maintenance terminal 131 and standby maintenance terminal 132 shown in FIG. 13, When a failure occurs at the service maintenance terminal 131, this terminal is replaced with the standby maintenance terminal 132. Since the power of the standby maintenance terminal 132 is always turned on, it cannot discriminate which one of the two maintenance terminals is the service maintenance terminal 131. The discrimination between the service and standby maintenance terminals can be made easily by making the standby maintenance terminal not provide the LED illumination of a specific pattern for general connection check.

Figure 10:
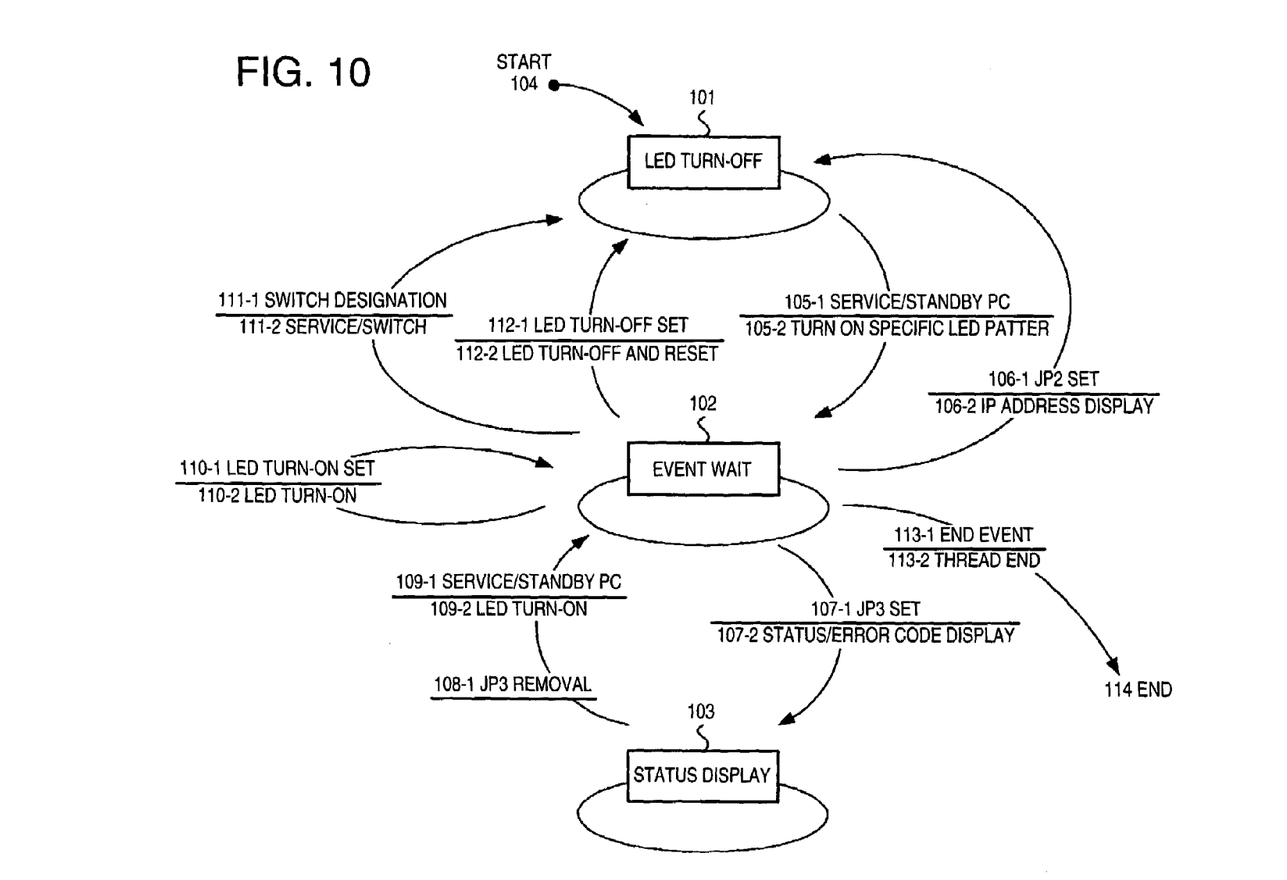
FIG. 10 is a status transition diagram of LED displays according to the invention.

FIG. 10 is a status transition diagram of LED representations according to the invention. Referring to FIG. 10, at a start 104 the status transits to an LED turn-off 101. In response to an event of service/standby PC 105-1, after the operation of a specific LED pattern turn-off 105-2, the status transits to an event wait 102.

In this case, in response to an event of a jumper connector (JP2) set, after an operation of a status/error code display 107-2 is performed, the status transits to a status display 103. In the case, after an event of a jumper connector (JP3) removal 108-1, in response to an event of service/standby PC 109-1 an operation of a specific LED pattern turn-on/turn-off 109-2 is performed and thereafter the status transits to an event wait 102.

In this case, in response to an event of an LED turn-on set 110-1, the operation of an LED turn-on 110-2 is performed and thereafter the event wait 102 resumes. Also in this case, in response to an event of an LED turn-off set 112-1, an operation of an LED turn-off and reset 112-2 is performed and thereafter the status transits to the LED turn-off 101. Also in this case, in response to an event of a switch designation 111-1, an operation of a service/standby switch 111-2 is performed and thereafter the status transits to an LED turn-off 101. Also in this case, in response to an end event 113-1, an operation of a thread end 113-2 is performed to thereafter terminate at 114.

Instead of the jumper connector into which the conduction jumper pin is inserted and the light emitting diode, other switches and liquid crystal displays may also be used.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A maintenance terminal for a disk array device connected to a network, the maintenance terminal setting said disk array device in the network and comprising:

a plurality of setting terminals each mounted on the maintenance terminal and capable of selectively changing the setting of said disk array device in the network, by selectively inserting a conduction pin therein; and a plurality of light emitting elements mounted on the maintenance terminal and capable of displaying a setting state of said disk array device by turning on or off said light emitting elements in accordance with the selectively changed setting state of said disk array device in the network, through selective insertion of said conduction pin into said plurality of setting terminals, wherein an IP address representative of an identification number on said network corresponding to said setting state is forcibly returned to initial setting through selective insertion of said conduction pin into said plurality of setting terminals to initialize a password permitting an input operation to said disk array device.

2. A maintenance terminal for a disk array device according to claim 1, wherein said light emitting elements are made to display said setting state or an error code at a present time through selective insertion of said conduction pin into said plurality of setting terminals.

3. A maintenance terminal for a disk array device according to claim 1, wherein said light emitting elements are turned on to display a specific pattern corresponding to said setting state in said network, and a same pattern as the specific pattern is also displayed on a screen of an operation terminal of said network.

4. A maintenance terminal for a disk array device connected to a network, the maintenance terminal setting said disk array device in the network and comprising:

a plurality of setting terminals each mounted on the maintenance terminal and capable of selectively changing the setting of said disk array device in the network, by selectively inserting a conduction pin therein; and a plurality of light emitting elements mounted on the maintenance terminal and capable of displaying a setting state of said disk array device by turning on or off said light emitting elements in accordance with the selectively changed setting state of said disk array device in the network, through selective insertion of said conduction pin into said plurality of setting terminals, wherein when setting a plurality of disk array devices is performed by classifying said disk array devices into several groups, said light emitting elements of said disk array devices to be subjected to setting on are made to display a predetermined pattern, in response to a request from an operation terminal of said network, and said light emitting elements of said disk array devices other than said disk array devices to be subjected to setting are made to turn off.

5. A maintenance terminal for a disk array device connected to a network, the maintenance terminal setting said disk array device in the network and comprising:

a plurality of setting terminals each mounted on the maintenance terminal and capable of selectively changing the setting of said disk array device in the network, by selectively inserting a conduction pin therein; and a plurality of light emitting elements mounted on the maintenance terminal and capable of displaying a setting state of said disk array device by turning on or off said light emitting elements in accordance with the selectively changed setting state of said disk array device in the network, through selective insertion of said conduction pin into said plurality of setting terminals, wherein a standby maintenance terminal is provided for said disk array device, when a failure occurs at said maintenance terminal, said maintenance terminal is replaced with the standby maintenance terminal, said standby maintenance terminal is always in a power-on state and said light emitting elements of said standby maintenance terminal are not turned off.

6. A maintenance terminal for a disk array device according to claim 1, wherein said plurality of setting terminals are jumper connectors into which said conduction pin is inserted, and said light emitting elements are light emitting photodiodes.

7. A maintenance terminal for a disk array device according to claim 1, wherein said plurality of setting terminals are switches and said light emitting elements constitutes a liquid crystal panel.

8. A maintenance terminal for a disk array device according to claim 4, wherein said light emitting elements are made to display said setting state or an error code at a present time through selective insertion of said conduction pin into said plurality of setting terminals.

9. A maintenance terminal for a disk array device according to claim 4, wherein said light emitting elements are turned on to display a specific pattern corresponding to said setting state in said network, and a same pattern as the specific pattern is also displayed on a screen of an operation terminal of said network.

10. A maintenance terminal for a disk array device according to claim 4, wherein said plurality of setting terminals are jumper connectors into which said conduction pin is inserted, and said light emitting elements are light emitting photodiodes.

11. A maintenance terminal for a disk array device according to claim 4, wherein said plurality of setting terminals are switches and said light emitting elements constitutes a liquid crystal panel.

12. A maintenance terminal for a disk array device according to claim 5, wherein said light emitting elements are made to display said setting state or an error code at a present time through selective insertion of said conduction pin into said plurality of setting terminals.

13. A maintenance terminal for a disk array device according to claim 5, wherein said light emitting elements are turned on to display a specific pattern corresponding to said setting state in said network, and a same pattern as the specific pattern is also displayed on a screen of an operation terminal of said network.

14. A maintenance terminal for a disk array device according to claim 5, wherein said plurality of setting terminals are jumper connectors into which said conduction pin is inserted, and said light emitting elements are light emitting photodiodes.

15. A maintenance terminal for a disk array device according to claim 5, wherein said plurality of setting terminals are switches and said light emitting elements constitutes a liquid crystal panel.

* * * * *